United States Patent
Naik et al.

(10) Patent No.: US 12,362,825 B2
(45) Date of Patent: Jul. 15, 2025

(54) SYSTEMS AND METHODS FOR ADDING NODES TO A NETWORK USING LIGHT-CARRIER ENABLED NETWORK

(71) Applicant: DELL PRODUCTS L.P., Round Rock, TX (US)

(72) Inventors: Ranjan Kumar Naik, Whitby (CA); Suraj S Shirolikar, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 135 days.

(21) Appl. No.: 18/165,131

(22) Filed: Feb. 6, 2023

(65) Prior Publication Data

US 2024/0267120 A1 Aug. 8, 2024

(51) Int. Cl.
- *H04B 10/11* (2013.01)
- *H04L 9/40* (2022.01)
- *H04B 10/116* (2013.01)
- *H04W 12/06* (2021.01)

(52) U.S. Cl.
CPC ............ *H04B 10/11* (2013.01); *H04L 63/126* (2013.01); *H04B 10/116* (2013.01); *H04W 12/06* (2013.01)

(58) Field of Classification Search
CPC ..... H04B 10/11; H04B 10/116; H04L 63/126; H04W 12/06
USPC .................................................. 398/118–131
See application file for complete search history.

(56) References Cited

U.S. PATENT DOCUMENTS

| | | | | |
|---|---|---|---|---|
| 6,775,480 | B1 * | 8/2004 | Goodwill | H04B 10/11 398/151 |
| 2002/0023143 | A1 * | 2/2002 | Stephenson | H04L 63/029 709/218 |
| 2002/0143770 | A1 * | 10/2002 | Schran | G06F 21/6263 |
| 2004/0243805 | A1 * | 12/2004 | Enokida | H04L 9/0891 713/175 |
| 2005/0005096 | A1 * | 1/2005 | Miller | G06F 21/575 713/155 |
| 2009/0288135 | A1 * | 11/2009 | Chang | H04L 63/20 726/1 |
| 2012/0128367 | A1 * | 5/2012 | Yamada | H04B 10/1149 398/118 |

(Continued)

OTHER PUBLICATIONS

A. Siff, "What Is Full Spectrum LED Lighting?" Medicgrow, Nov. 2022, [online], [Retrieved Aug. 10, 2024]. Retrieved from Internet.

*Primary Examiner* — Dibson J Sanchez
(74) *Attorney, Agent, or Firm* — BAUGH LAW, LLC

(57) ABSTRACT

Light signal-based networking, such as LiFi (light fidelity), has become more prevalent. Such networking means provide a bidirectional wireless system that transmits data via LED or infrared light. Embodiments use light-signal-based networking to easily and securely add new information handling systems to an existing network. In one or more embodiments, matching both pre-set light carrier settings and trust data help make the addition of a node to the network quick and secure. In one or more embodiments, additional security and authentication mechanisms (e.g., tunneling, multi-factor authentication, passwords, token+ passwords, secure protocols (e.g., Role-Based Access Control (RBAC), Lightweight Directory Access Protocol (LDAP), etc.) may also be used to further strengthen trust for the network, for the new client node, or both. Once trusted, information about the new client may be added to a datastore to allow other nodes in the network access to a listing of trusted nodes.

20 Claims, 13 Drawing Sheets

(56) References Cited

U.S. PATENT DOCUMENTS

| | | | | |
|---|---|---|---|---|
| 2012/0159600 | A1* | 6/2012 | Takagi | G06F 21/32 |
| | | | | 726/7 |
| 2014/0250498 | A1* | 9/2014 | Yamasaki | H04L 9/32 |
| | | | | 726/4 |
| 2016/0254864 | A1* | 9/2016 | Mueller | H04W 12/062 |
| | | | | 398/118 |
| 2017/0195046 | A1* | 7/2017 | Cheon | H04L 12/2809 |
| 2017/0318460 | A1* | 11/2017 | Kumar | H04B 10/116 |
| 2017/0338951 | A1* | 11/2017 | Fu | H04L 9/0894 |
| 2018/0139202 | A1* | 5/2018 | Sethi | H04W 84/12 |
| 2019/0149234 | A1* | 5/2019 | Burchardt | H05B 47/19 |
| | | | | 398/118 |
| 2020/0382958 | A1* | 12/2020 | Wang | H04W 12/06 |
| 2022/0385363 | A1* | 12/2022 | Gette | H04B 10/1125 |

\* cited by examiner

200

```
┌─────────────────────────────────────────────────────────────┐
│ Assign a unique identifier (e.g., server UUID) to an         │
│ information handling system, in which the unique identifier  │
│ may be formed using a combination of one or more parameter   │─ 205
│ values (e.g., information handling system type (e.g.,        │
│ storage or server), specification(s), registry value,        │
│ etc.) that associated with the information handling system   │
└─────────────────────────────────────────────────────────────┘
                              │
                              ▼
┌─────────────────────────────────────────────────────────────┐
│ Configure the information handling system to operate via     │
│ LiFi using specific LiFi settings (e.g., frequency range,    │─ 210
│ intensity modulation, encryption or encoding, etc.) when     │
│ interacting with a client node                               │
└─────────────────────────────────────────────────────────────┘
```

| Add an authorized listing of unique identifier(s) of server nodes (e.g., Server UUID and/or MAC address range(s)) | ⎯ 305 |

| Configure the client information handling system to operate via LiFi using specific LiFi settings (e.g., frequency range, intensity modulation, encryption or encoding, etc.) when interacting with a server node | ⎯ 310 |

```
Client -- LDNA Data Store

Server UUID1           = <value>
MAC Address range1     = <value>

Server UUID2           = <value>
MAC Address range2     = <value>
...

Server UUIDn           = <value>
MAC Address rangen     = <value>
```

FIG. 8A

```
Server -- LDNA Data Store

Client Node 1 UUID1    = <value>
MAC Address(es)1       = <value>

Client Node 1 UUID1    = <value>
MAC Address(es)1       = <value>
...

Client Node m UUIDm    = <value>
MAC Address(es)m       = <value>
```

| Mutual Trust Data Store | | |
|---|---|---|
| Client Node 1 | = | MAC Address(es)1 |
| | = | Client UUID1 |
| | = | Type (server, storage, etc.) |
| | = | ... |
| Client Node _x_ | = | MAC Address(es)_x_ |
| | = | Client UUID_x_ |
| | = | Type (server, storage, etc.) |
| | = | ... |

> Following successful connection, update a logbook or registry at the server node and/or at a central repository of parameters related to the client nodes ⟵ *1105*

SYSTEMS AND METHODS FOR ADDING NODES TO A NETWORK USING LIGHT-CARRIER ENABLED NETWORK

BACKGROUND

A. Technical Field

The present disclosure relates generally to information handling systems. More particularly, the present disclosure relates to adding information handling system (or "nodes") to a network.

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasing demands for data and communications have resulted in vast arrays of ever-expanding networks. As these networks expand, new equipment is added at different times and for different reasons, such as to add new functionality and features, to replace aging equipment, to expand capacity, etc. One result of such expansions is that it can consume significant amounts of time for the network administrators to install and add new information handling systems to the network. Furthermore, the increasingly complex nature of networks and information handling systems contributes to the complexity for network administrators when adding new information handling systems to a network. And, because security is a critical feature of networks, it is important that trusted devices are added to a network and that rogue devices are blocked from joining the network.

In addition to the added demands on network administrators, the sharp upward trend in the growth of network-connected hardware devices has affected other aspects of networking. For example, the existing Radio Frequency (RF) spectrum used for wireless communication between clients and servers is becoming saturated.

Accordingly, it is highly desirable to find new, efficient, and secure ways to add information handling systems, which may be referred to for convenience as nodes, to a network.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 2 depicts a methodology for configuring a server node according to embodiments of the present disclosure.

FIG. 3 depicts a methodology for configuring a client node, according to embodiments of the present disclosure.

FIG. 8A depicts an example client light DNA ("LDNA") data store, according to embodiments of the present disclosure.

FIG. 8B depicts an example server LDNA data store, according to embodiments of the present disclosure.

FIG. 10 depicts an example trust data store, according to embodiments of the present disclosure.

FIG. 11 a method for managing or monitoring client nodes that have been added to the network, according to embodiments of the present disclosure.

DETAILED DESCRIPTION OF EMBODIMENTS

Figure 1:
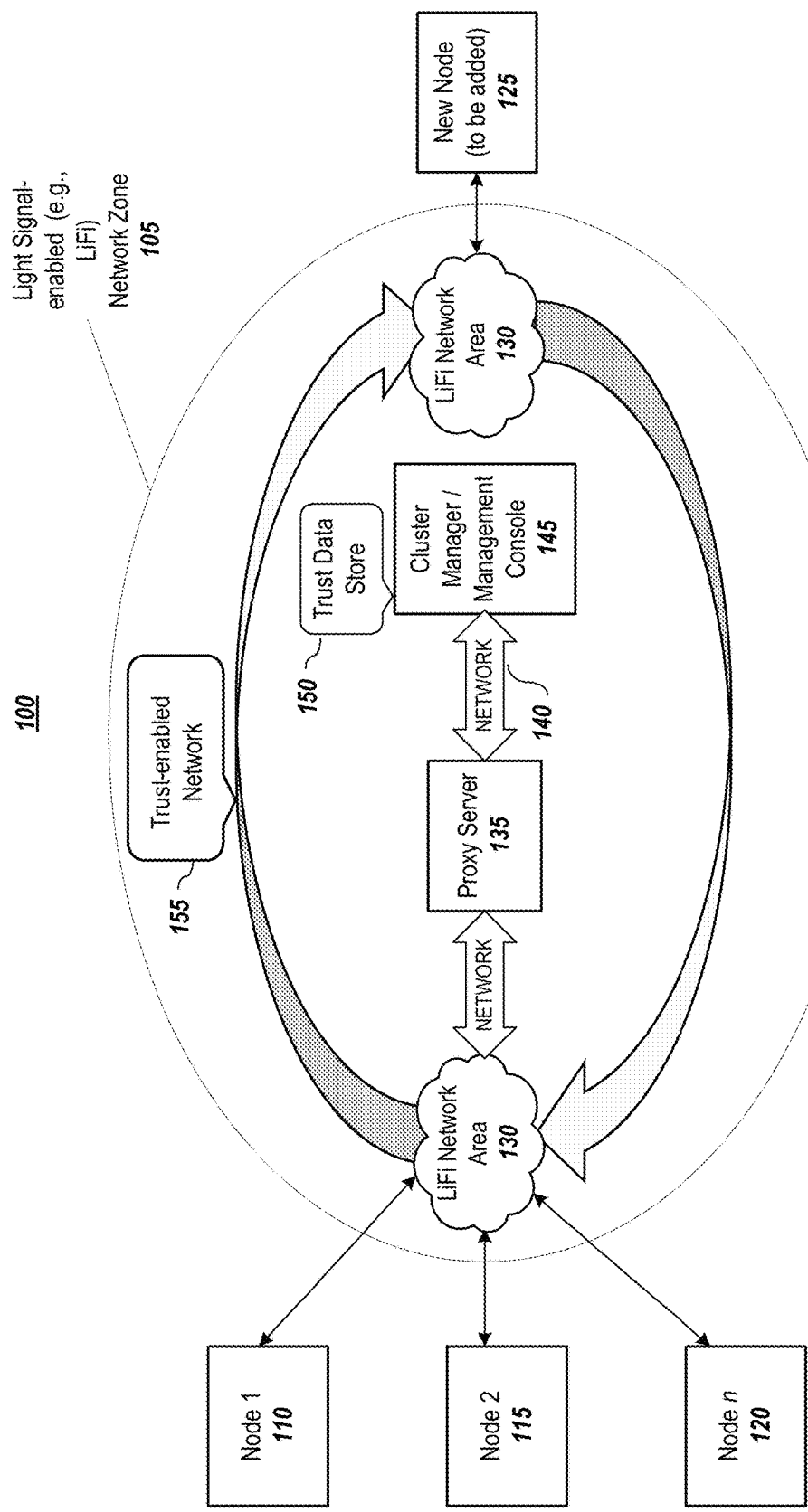
FIG. 1 ("FIG. 1") graphically illustrates an example network, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of LiFi networks, aspects of the present disclosure are not so limited. Accordingly, the aspects of the present disclosure may be applied or adapted for use in other contexts.

A. General Overview

As noted above, the upward trend in the growth of network-connected information handling systems has affected many aspects of networking. For example, the existing Radio Frequency (RF) spectrum used for wireless communication between clients and servers is becoming saturated. Thus, non-RF-based communication systems, like LiFi (light fidelity), are rapidly evolving—particularly given the availability of efficient and low-cost electronic components like Light Emitting Diodes (LED) and laser diodes. LiFi is a wireless optical networking technology that allows for bidirectional communication by transmitting data via LED or infrared light. Unlike WiFi, which uses radio frequency, LiFi technology uses a light source with a chip to transmit a signal through light waves and a receptor/receiver that receives the light and decodes the transmitted data. Given the bidirectional nature of such communications, a dongle or component of an information handling system comprises a light emitting source (e.g., LED) to transmit data and a detector (e.g., photodiode) to detect a signal.

Currently, existing methods for adding nodes to a network tend to be labor intensive and cumbersome. Typically, an admin has to perform some level of manual configuration, such as adding a node using zoning, adding a node using private networks, or adding a node with multiple network options (e.g., Dynamic Host Configuration Protocol (DHCP), switches, closed network, etc.). None of these approaches allows headers or LiFi method zoning to add a node.

Embodiments herein seek to reduce the complexity of adding a new information handling system node to a network using light signals (e.g., LiFi). To help make the process more secure, embodiments involve the sending of one or more unique identifiers using a pre-defined set of frequencies separated by guard band frequency, enabling the detection of data bits from the data frame using laser diodes or LEDs. In one or more embodiments, the data may be transmitted by modulating the signals using on-off keying or orthogonal frequency division multiplexing (OFDM) and hence each wavelength may be used as a separate data channel.

In one or more embodiments, one or more additional security methods may be employed. For example, one-time password (OTP), multi-factor authentication, biometrics, and/or other authentication methods may be used. In addition to the security measures listed above, the data exchange process may also be secured by using a secured communication, such as tunneled data channels, encryption, public/private keys, etc. One skilled in the art shall recognize that number security means exist for data communications and that one or more of such means may be employed in one or more embodiments.

FIG. 1 graphically illustrates an example network, according to embodiments of the present disclosure. Depicted in FIG. 1 is a light signal-enabled network zone 105 that facilitates communication with nodes (e.g., Node 1 110, Node 2, 115, and Node n 120) via a light signal-based network 130. It should be noted that LiFi is used herein for convenience to represent light signal-enabled communications; but it shall be understood that embodiments are not limited to the specific LiFi standard implementations of light signal-based communication. Note that nodes may be different types of information handling system, such as storage, servers, hosts, etc.

FIG. 1 also includes additional network elements, such as one or more proxy servers 135 and a management console 145 for interfacing with network elements/nodes and other admin functions—all of which may be connected by one or more additional network elements 140.

Note that FIG. 1 depicts a new node 125 to be added to the network 100 via the LiFi network interface 130. As explained in more detail below, embodiments facilitate the secure and trusted addition of an information handling system to the network (e.g., a Dell data domain node being added to a management node). To help establish trust between nodes, a combination of factors may be defined to determine trust. For example, a unique set of data (i.e., "trust information") may be shared via unique set of settings for the light signal to create what is referred to herein as "light DNA" or "LDNA" because the combination of matching content and conveyance means forms a unique identifier for the information handling system—akin to the uniqueness of DNA. Thus, in one or more embodiments, a network server may only accept a new node when an LDNA (i.e., a combination of data content (e.g., Dell server parameters) and specific setting(s) for the light carrier (e.g., light intensities and frequencies)) is valid. LDNA information may be burned into the server at manufacturing or configuration and may be stored in a server registry. Similarly, LDNA information may be burned into a client node at manufacturing or configuration.

Finally, the network 100 may include a trust data store 150 that lists the nodes that have properly been added to the network so that other information handling systems in the network can determine whether a node is trusted or potentially a rogue node. In one or more embodiments, the trust data store may contain a whitelist of trusted nodes, but additionally, the trust data store may also include a blacklist of untrusted nodes and/or a graylist of unknown trust level nodes (e.g., in process nodes). Thus, embodiments herein create a trust-enabled network 155. It shall also be noted that embodiments are extensible across information handling systems—embodiments may be used to add storage nodes, servers, etc.

One skilled in the art shall recognize that embodiments provide automatic, fast, simple, and trusted connections for nodes added to a network. Also, it shall be noted that using a light signal to communicate provides many benefits including speed (i.e., it can be up to 100 times faster than WiFi), ease of deployment, and less need for wiring given that it is wireless. For example, LED-based LiFi can reach data rates of 10 Gb/s, and use of laser diodes boosts data transfer rates to greater than 100 Gb/s.

B. Initial Develop of Information Handling Systems

In one or more embodiments, to embed trust and simplicity into the node-addition process, a new node (which may also be referred to as a client node) and a network (or server) node (i.e., a secure node in the network with which the client node interacts to join the network) are specially configured.

1. Embodiments of Server Node Configuration

FIG. 2 depicts a methodology for configuring a server node, according to embodiments of the present disclosure. In one or more embodiments, a unique identifier (e.g., a server universally unique identifier (UUID)) is assigned (205) to an information handling system that is to operate as a server or network node. As explained in more detail below, the server UUID may be used as server trust information that is shared with a client node.

In one or more embodiments, the unique identifier may be formed using a combination of one or more parameters that are associated with the information handling system. For example, in one or more embodiments, the server unique identifier may be formed from one or more of the following parameters: range of frequency, intensity modulation, information handling system type (e.g., storage type (e.g., SAN/NAS), server type (e.g., rack/blade), etc.), model type, configuration, compute resources, registry value range (e.g., registry parity in case of hardware or virtual), etc. The server unique identifier may be a unique pattern of characters particular to a manufacturer (e.g., Dell devices). The UUID may be generated during factory installation by the manufacturer, OEM, or deployer; or, the UUID may be generated and assigned later. In one or more embodiments, the unique identifier may be generated by an algorithmic pattern generator. In one or more embodiments, the same algorithmic principles may be used by the receptors for decoding. For example, given a known algorithmic methodology, the parameter(s) about the information handling system may be ascertained from the UUID. In one or more embodiments, as part of the onboarding process, the client node may use the server parameter information to determine compatibility or other issues.

In one or more embodiments, the information handling system is also configured (210) to operate via LiFi using specific LiFi settings (e.g., frequency range, intensity modulation, etc.) when interacting with a client node. In one or more embodiments, the configuration may also include communicating via certain encoding and security (e.g., encryption, tunnelling, etc.). As will be explained in more detail below, communicating via specific LiFi settings is one criterion by which a server, a client, or both may infer that the other device is trustworthy or identifiable.

In one or more embodiments, the server information handling system may also contain or have access to a server LDNA data store. FIG. 8B depicts an example server LDNA data store, according to embodiments of the present disclosure. In one or more embodiments, the server LDNA data store represents a listing of identifiers (e.g., a client UUID for each client node) and may also include one or more additional identifiers or parameters, such as a client MAC (media access control) address, addresses, or address range for the client nodes. The server LDNA list may be created when the server was manufactured, when commissioned for use, when deployed, and/or created or updated related to client node generation or deployment. For example, in one or more embodiments, a server may have had the server LDNA data store installed during manufacturing. Alternatively, or additionally, as client nodes are manufactured or commissioned for deployment, the server LDNA data store may be populated (at least in part) by information from a trusted source about these client nodes (i.e., akin to computer updates). The updates may be pushed to the server node, may be pulled by the server node, or both.

As explained in more detail below, in one or more embodiments, a condition of a client node being accepted as a new node is that the server LDNA and light carrier/signal settings match what the client node expects. Additionally, or alternatively, as explained in more detail below, in one or more embodiments, a condition of a client node being accepted as a new node is that the client LDNA and light carrier/signal settings match what the server node expects.

2. Embodiments of Client Node Configuration

FIG. 3 depicts a methodology for configuring a client node, according to embodiments of the present disclosure. In one or more embodiments, a client node may be configured (305) with an authorized listing of unique identifier(s) of server nodes, and may also include one or more additional parameters. The authorized listing may be referred to as a client LDNA data store.

FIG. 8A depicts an example client LDNA data store, according to embodiments of the present disclosure. In the depicted embodiments, the client LDNA data store comprises a listing of trusted servers, in which a server entry comprises server UUID and may include one or more additional parameters, such as MAC address(es) or MAC address range(s), although different or additional parameters may be used. The client LDNA data store may be created when the client is manufactured, when commissioned for use, when deployed, and/or created or updated related to server node deployment in the network. For example, in one or more embodiments, a client may have had the client LDNA data store installed during manufacturing. Alternatively, or additionally, as server nodes are deployed, the client LDNA data store may be populated (at least in part) by information from a trusted source about these server nodes (i.e., akin to computer updates).

Returning to FIG. 3, in one or more embodiments, the client node is configured (310) to operate via light carrier (or medium) using specific settings (e.g., frequency range, intensity modulation, encryption or encoding, etc.) when interacting with a server node. In one or more embodiments, the configuration may also include communicating via certain encoding and security (e.g., encryption, tunnelling, etc.). As will be explained in more detail below, communicating via specific LiFi settings is one criterion by which the client node may infer that the server node is trustworthy or identifiable.

It should be noted that, while not depicted in FIG. 3, a client UUID may be generated for use in a server LDNA data store (see, e.g., FIG. 8B). In one or more embodiments, the client unique identifier may be formed using a combination of one or more parameters that are associated with the client information handling system. For example, in one or more embodiments, the client unique identifier may be formed from one or more of the following parameters: range of frequency, intensity modulation, information handling system type (e.g., storage type, server type, etc.), compute resources, configuration, registry value range, model type, etc. The client unique identifier may be a unique pattern of characters particular to a manufacturer (e.g., Dell devices). The UUID may be generated during factory installation by the manufacturer, OEM, or deployer; or, the UUID may be generated and assigned later. In one or more embodiments, the unique identifier may be generated by an algorithmic pattern generator. In one or more embodiments, the same algorithmic principles may be used by the server node for decoding information about the client node. For example, given a known algorithmic methodology, the parameter(s) about the client information handling system may be ascertained from the UUID. In one or more embodiments, as part of the onboarding process, the server node may use the client parameter information to determine compatibility or other issues, and may block addition of the client node if it is incompatible with the network.

According to embodiments, a client node added to a LiFi-enabled network will contain a predetermined LDNA (e.g., light signal settings and trust information) that may be used to onboard or add the client node to the networking with some level of trust.

C. Embodiments for Adding a Client Node to a Light Signal-Enabled Network

Figure 4:
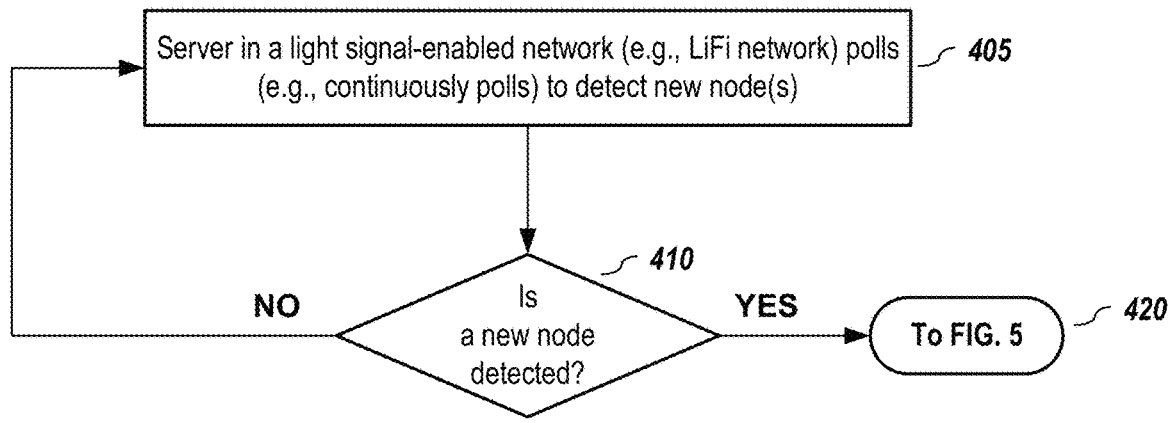
FIG. 4 depicts an initial phase for adding a client node to a light signal-enabled network, according to embodiments of the present disclosure.

FIGS. 4-9 depict methodologies for adding a client node to a light signal-enabled network, according to embodiments of the present disclosure. Starting with FIG. 4, depicted is an initial phase for adding a client node to a light signal-enabled network, according to embodiments of the present disclosure. In one or more embodiments, the server node in a Li-Fi network polls (405) (e.g., continuously polls, periodically polls, etc.) to detect new node(s). For example, in FIG. 1, new node 125 interfaces with a server node in the LiFi network 130 via light signal. The server node transmits a polling/detecting light signal and awaits a response from a new node.

If no new node is detected (410), the server node may continue to poll (405) for new nodes. However, if a new node is detected (410), a process for checking the validity of the node may proceed (420).

Figure 5:
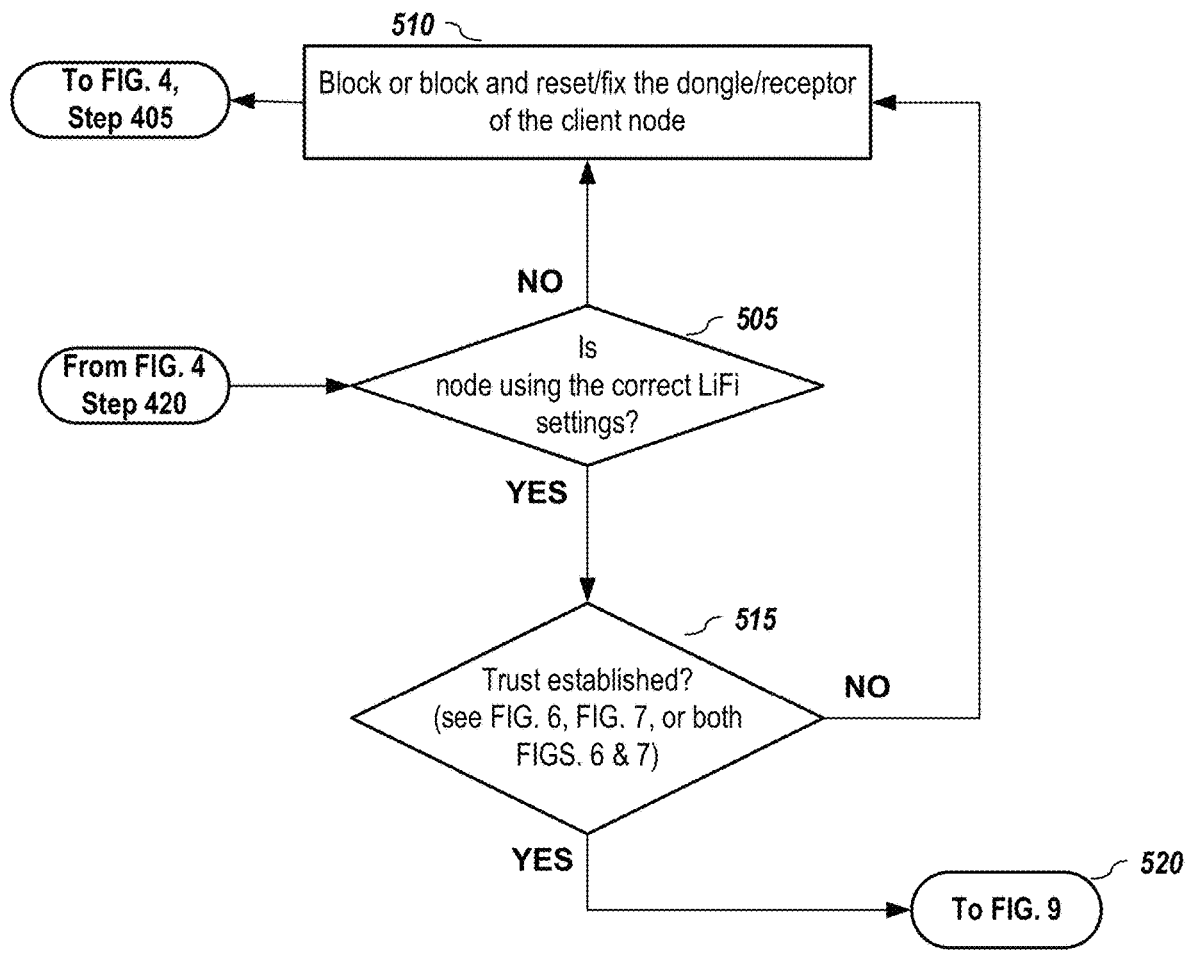
FIG. 5 depicts a process, at least in part, for checking the validity or trust of a new client node, according to embodiments of the present disclosure.

FIG. 5 depicts a process, at least in part, for checking the validity or trust of a new client node, according to embodiments of the present disclosure. An initial check is performed (505) to determine whether the new node is using the correct light carrier settings. Recall that, in one or more embodiments, the client node should have been configured to operate via a light signal/carrier using specific settings (e.g., frequency range, intensity modulation, etc.). For example, the laser diode driver for the dongle of the client node should perform modulation with wavelength bands in range 380-478 nm (nanometers), spectral width 98 nm.

If the client node is not transmitting using these settings, in one or more embodiments, the server node blocks (510) the client node. Alternatively, in addition to blocking the client node, the server node may send a signal to cause the receptor/dongle (i.e., the light signal transmitter and receiver) of the client node to reset. The signal may automatically cause reset at the client node, or alternatively, the signal may be sent to an administrator who performs the fixing/resetting. In one or more embodiments, once fixed or reset, the client node may return as a new client node and repeat the process starting at Step 405 of FIG. 4. In one or more embodiments, the server node may keep a counter of how many times the client node has failed Step 505. Responsive to the client node failing Step 505 a set threshold number of times, the server node may permanently block that client node.

Figure 6:
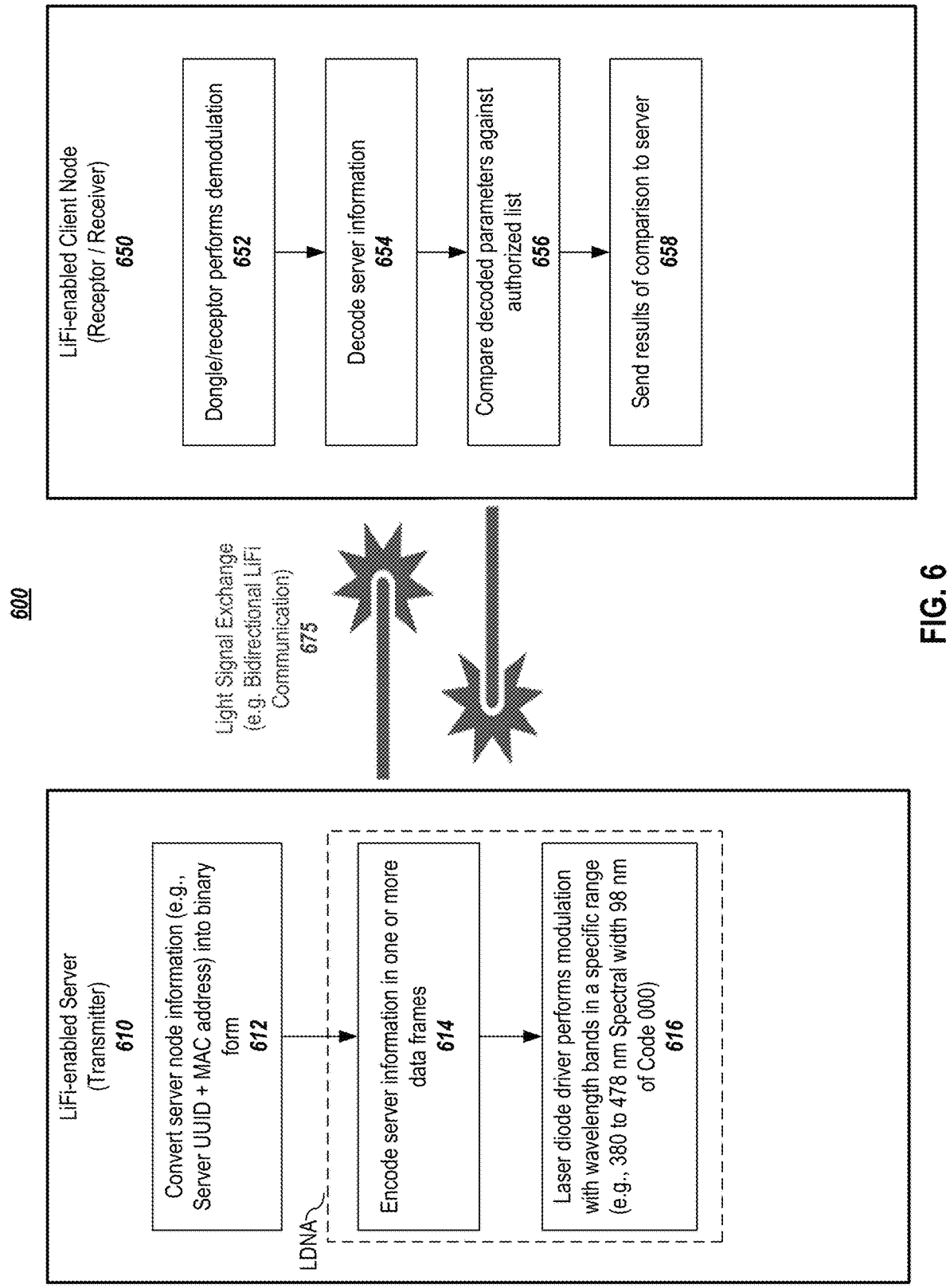
FIG. 6 depicts a methodology for the client node verifying that the server node is correct, according to embodiments of the present disclosure.
Figure 7:
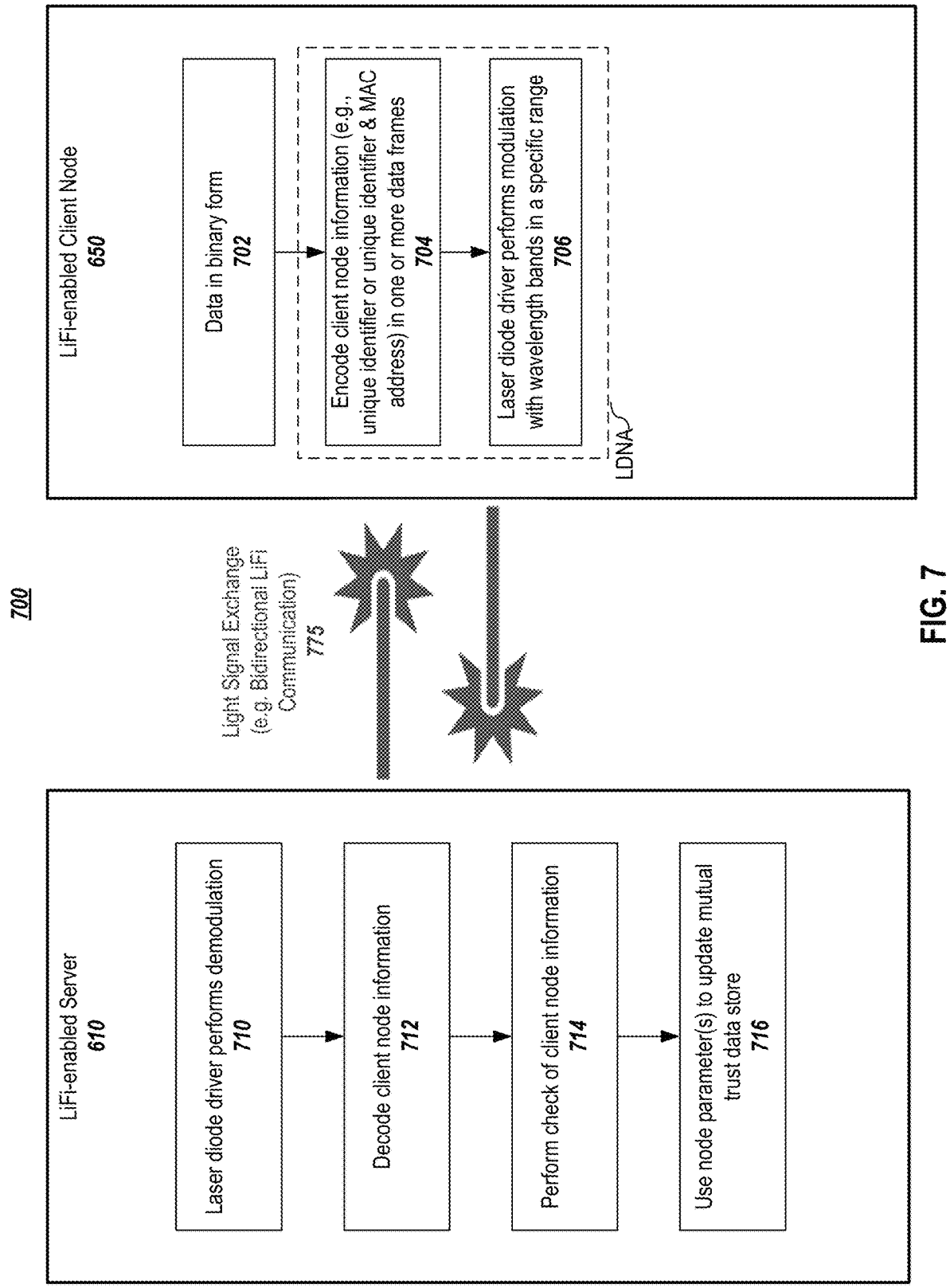
FIG. 7 depicts a methodology for the server node verifying that the client node is correct, according to embodiments of the present disclosure.

If the client node is transmitting using the correct light carrier settings, in one or more embodiments, the server node makes a trustworthiness determination (515) with the client node. In one or more embodiments, trustworthiness may be determined by the server node and client node performing one or more trust evaluations. FIGS. 6 and 7 depict example trustworthiness checks, according to embodiments of the present disclosure.

FIG. 6 depicts a methodology for the client node verifying that the server node is correct, according to embodiments of the present disclosure. In one or more embodiments, the server node 610 converts (612) its server node information (e.g., Server UUID+MAC address or MAC address range) into binary form. This binary data is encoded (614) in one or more data frames, and the server node's laser diode driver performs (616) modulation to transmit the information with wavelength bands in a specific range (e.g., 380 to 478 nm Spectral width 98 nm). The server node transmits, via a laser diode or LED 675, the server information to the client node 650. Note that, in one or more embodiments, the information exchange may include using specific encoding and/or security (e.g., encryption, tunnelling, etc.).

The client node 650 receives the light signal 675 at its dongle/receptor, which performs (652) demodulation from the light carrier. The client node decodes (654) the server information that has been received by the client node. In one or more embodiments, the client node compares (656) the decoded parameters against its authorized list. For example, the client node checks the server information against its client LDNA data store (e.g., FIG. 8A).

If the information is not present, the process may return to Step 510 as discussed above, in which the server node may terminate the addition process, and in one or more embodiments, a network admin may take one or more actions, including checking the server node information, the client node, or both.

In one or more embodiments, the server node may keep a counter of how many times the client node has failed Step 515. Responsive to the client node failing Step 515, a set threshold number of times, the server node may permanently block that client node.

In one or more embodiments, the client node may also block/terminate the network adding process in addition to notifying (658) the server node, an admin, or both. The client node may notify the admin by causing a light or set of lights to illuminate on the client node (e.g., turn on an unrecognized server light indicator) or by sending a message. It may be that the client node selected or configured by the admin is the incorrect for this network. The admin may take one or more actions, such as updating the client LDNA data store, changing the client node, changing configuration of the client node, changing configuration of the server node, etc.

If the server's information is present in the client's LDNA data store, the client node notifies (658) the server node, and the process of adding the client node may continue (e.g., check at Step 515 in FIG. 5 is successful and method proceeds to Step 520).

FIG. 7 depicts a methodology for the server node verifying that the client node is correct, according to embodiments of the present disclosure. In one or more embodiments, the client node 650 converts (702) its client node information (e.g., client UUID or client UUID+MAC address) into binary form. This binary data is encoded (704) in one or more data frames, and the client node's laser diode driver performs (706) modulation to transmit the information with wavelength bands in a specific range (e.g., 380 to 478 nm Spectral width 98 nm). The client node transmits, via a laser diode or LED, the client information to the server node 610. Note that, in one or more embodiments, the information exchange may include using specific encoding and/or security (e.g., encryption, tunnelling, etc.).

The server node 610 receives the light signal 775 at its dongle/receptor, which performs (710) demodulation from the light carrier. The server node decodes (712) the client information that has been received from the client node. In one or more embodiments, the server node compares (714) the decoded parameters against its authorized list. For example, the server node checks the client information against its server LDNA data store (e.g., FIG. 8B).

If the information is not present, the process may return to Step 510 as discussed above, in which the server node may terminate the addition process, and in one or more embodiments, a network admin may take one or more actions, including checking the server node information, the client node, or both. In one or more embodiments, the server node may keep a counter of how many times the client node has failed Step 515. Responsive to the client node failing Step 515, a set threshold number of times, the server node may permanently block that client node.

In one or more embodiments, the server node may notify an admin by causing a light or set of lights to illuminate on the client node (e.g., turn on an unrecognized client light indicator) or by sending a message. The admin may take one or more actions, such as updating the server LDNA data store, changing the client node, change configuration of the server node and/or client node, etc.

If the client's information is present in the server's LDNA data store, the process of adding the client node may continue (e.g., check at Step 515 in FIG. 5 is successful and method proceeds to Step 520).

Figure 9:
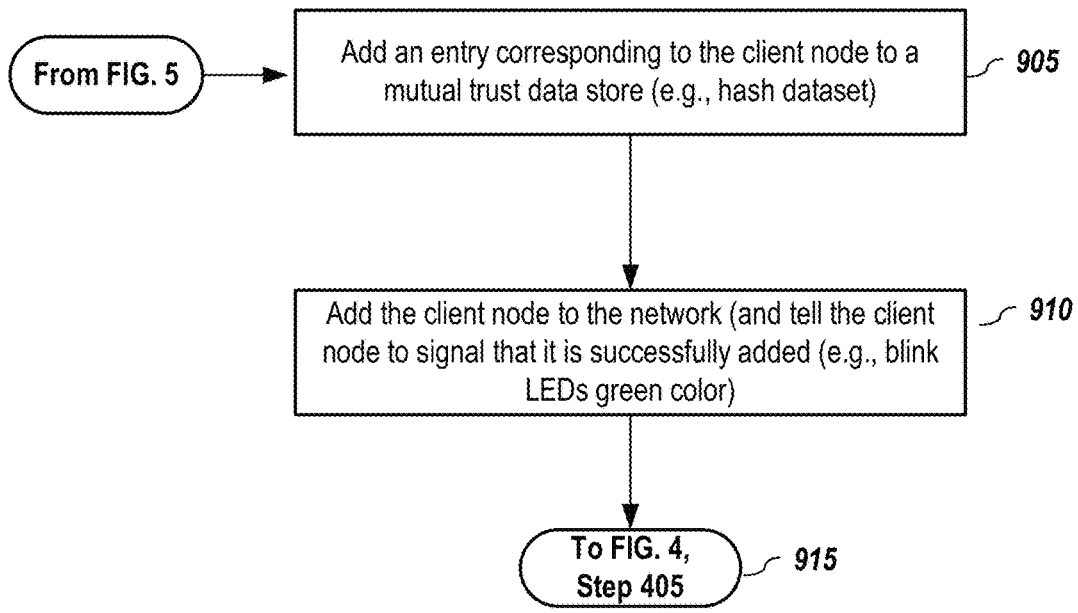
FIG. 9 depicts a method for adding a client node to the network, according to embodiments of the present disclosure.

FIG. 9 depicts a method for adding a client node to the network, according to embodiments of the present disclosure. Following successful validation at Step 515 of FIG. 5, the server node may add (905) an entry corresponding to the client node into a trust data store (e.g., hash dataset) (e.g., trust data store 105 of FIG. 1). In one or more embodiments, the trust data store may be accessible by all information handling systems on the network. Thus, in one or more embodiments, these other information handling system nodes in the network know that the client node has been vetted and can be trusted, and via the mutual trust data store (or other sources) may also obtain information for connecting to the new client node.

FIG. 10 depicts an example trust data store, according to embodiments of the present disclosure. In one or more embodiments, the trust data store comprises information about the added client nodes and may contain additional information or links to other information, such as networking connectivity information, client node parameters (e.g., model type, compute resource specifications, etc.). The client node information may be derived from its UUID, may be included in the client information submitted as part of the verification processes, or may be sent in subsequent communications.

Returning to FIG. 9, in one or more embodiments, the server node (or an admin) may complete any additional steps needed to add (910) the client node to the network. The server node may also indicate to the client node to signal that it is successfully added. For example, the client node may have light indicators that indicate (e.g., blink LED indicator a specific color (e.g., green)) that the client node is successfully connected to the network. Having a light indicator at the client node may be beneficial to an administrator who is at the client node trying to add it to the network. The indicator lets the administrator know that the process successfully completed. As noted above, the client node may have other indicators in case it fails, in which the indicators may include indicators that show at what stage in the overall addition methodology the process failed.

Following successful addition to the trust data store 150 and to the network, the server node may return (915) to polling for new client nodes (e.g., Step 405 of FIG. 4).

D. Embodiments for Managing Client Nodes

FIG. 11 depicts a method for managing or monitoring client nodes that have been added to the network, according to embodiments of the present disclosure. In one or more embodiments, following successful connection of the client node, a logbook or registry at the server or a central repository of parameters related to the client nodes may be updated (1105). In one or more embodiments, an administrator may query the logbook to obtain information about client nodes (e.g., which client nodes are currently active, which client nodes are inactive or have disconnected, is the client node valid connection LEDs indicating successful addition to network (i.e., blinking GREEN)?, etc.). One skilled in the art shall recognize other benefits and uses of a logbook or registry.

It shall also be noted that once successfully added, the client node may be managed like any other valid node of the network, as

E. Embodiments for Multiple Client Nodes

In one or more embodiments, the process of adding/onboarding a client node may be streamlined for multiple new client nodes. Since a datacenter may add a number of new client nodes at one time, embodiments may allow for a faster process, particularly when the client nodes are very similar or clones.

In one or more embodiments, a datacenter employee/admin brings multiple new client nodes (e.g., a set of database servers, set of NAS or SAN devices, etc.) into the LiFi network, where a management server (which may be performing storage/server operations) is polling to detect new node(s). Once a power supply is connected, a light indicator may start flashing (e.g., flashing continuous white on the LiFi dongle) indicating polling. The management server's LiFi dongle is present in the datacenter and is part of the LiFi network. Each new client node comprises a LiFi dongle and contains a predetermined LDNA. As noted above, in one or more embodiments, the server, the client nodes, or both accepts only specific range of frequency and intensity modulation as part of the addition process. Alternatively, it may also be that the server, the client nodes, or both accepts only a specific range of frequency, intensity modulation, and certain parameters (e.g., storage & server type).

The datacenter employee waits for an indicator on the dongles to indicate successful node additions (e.g., indicator changes green). In the background, an embodiment of the addition process handshake between the server and a client node occurs. In one or more embodiments, an identifier, such as the client identifier or a different identifier, may be shared early in the addition/onboarding stage (such as part of the initial polling response, after the server has been trusted by the client, or at another time) that may be used to identify the client node as a potential clone or similar node that has already been added. The server node may use this identifier to truncate at least some of the process discussed in embodiments (above) and add the node(s) to the trust store (e.g., trust store 150 in FIG. 1). For example, if the concern is related to the parameters of new client nodes, the identifier may indicate configuration/parameter settings. Thus, a match with an existing value may allow the server node to skip determining or performing additional validation of parameters and assume that the new node is a clone of existing and hence permit the addition to the network. In one or more embodiments, a dataset hash value may be used for matching a new node and to an existing hash in the datastore. In one or more embodiments, matching of similar nodes may also be used to apply other settings, such as network configurations to the new nodes, which information may also be stored in the trust datastore or elsewhere.

F. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 12:
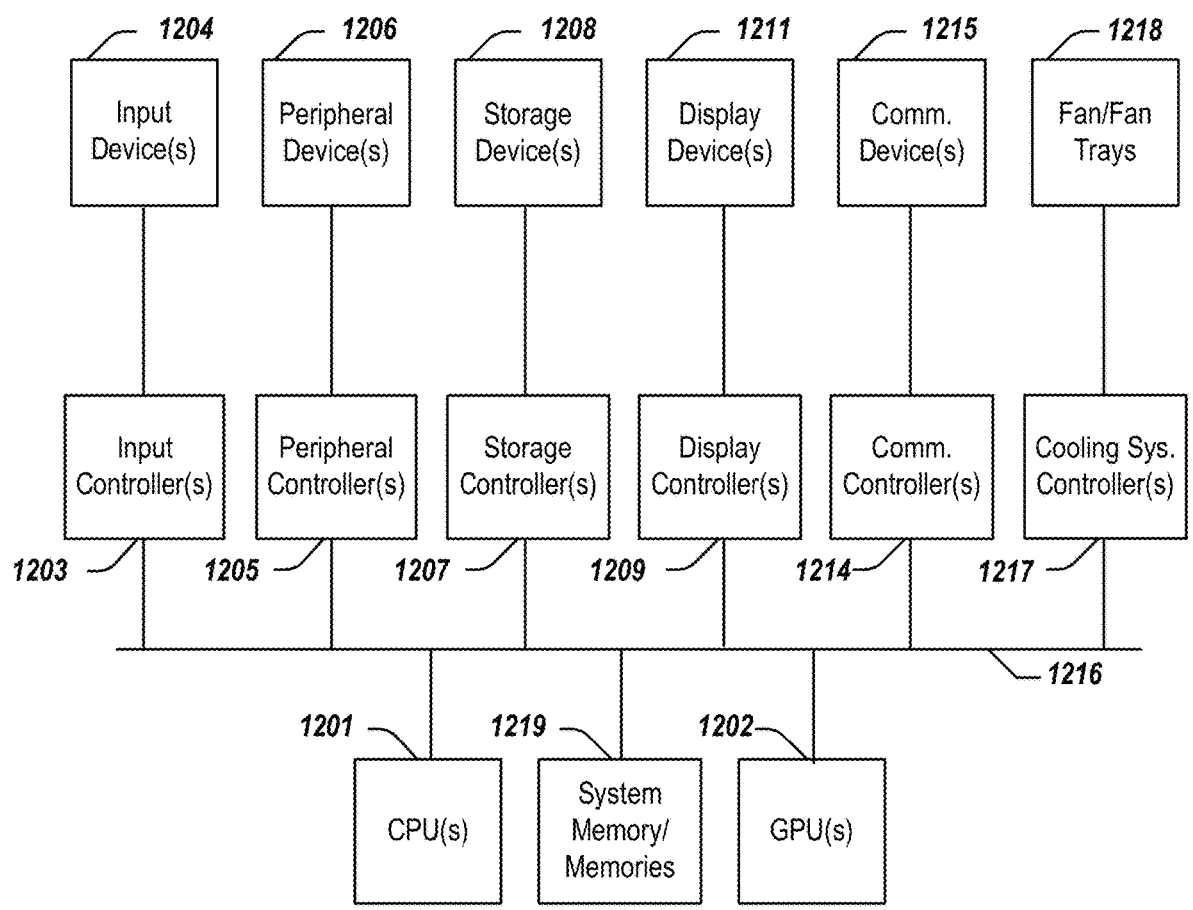
FIG. 12 depicts a simplified block diagram of an information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more CPUs 1201 that provides computing resources and controls the computer. CPU 1201 may be implemented with a microprocessor or the like and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204, such as a keyboard, mouse, touchscreen, stylus, microphone, camera, trackpad, display, etc. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 13:
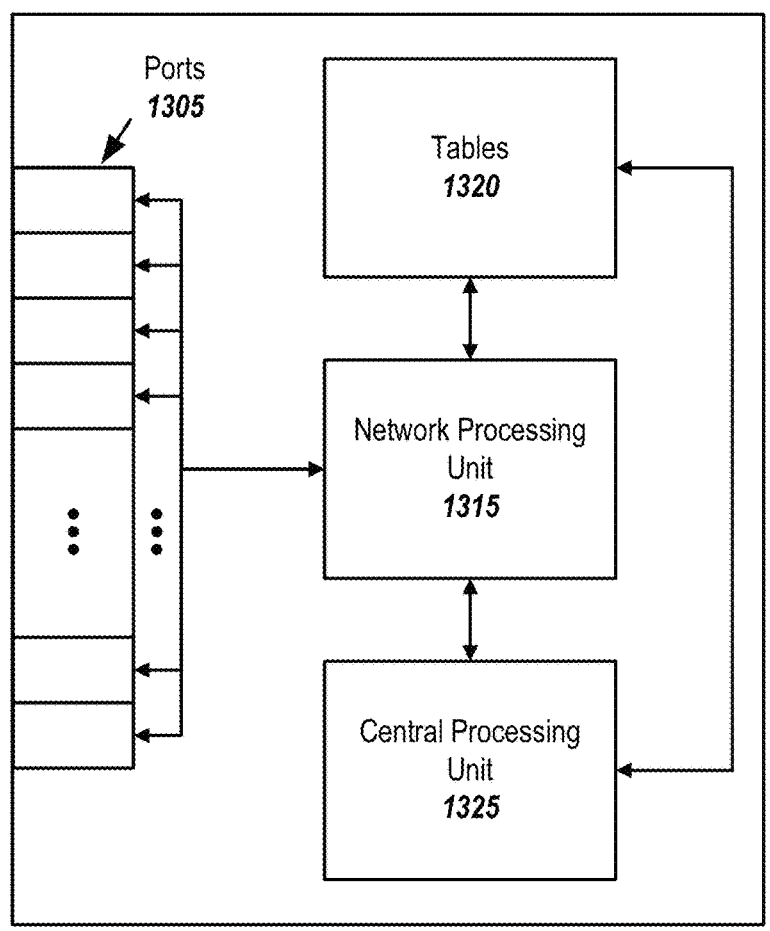
FIG. 13 depicts an alternative block diagram of an information handling system, according to embodiments of the present disclosure.

FIG. 13 depicts an alternative block diagram of an information handling system, according to embodiments of the present disclosure. It will be understood that the functionalities shown for system 1300 may operate to support various embodiments of the present disclosure—although it shall be understood that such system may be differently configured and include different components, additional components, or fewer components.

The information handling system 1300 may include a plurality of I/O ports 1305, a network processing unit (NPU) 1315, one or more tables 1320, and a CPU 1325. The system includes a power supply (not shown) and may also include other components, which are not shown for sake of simplicity.

In one or more embodiments, the I/O ports 1305 may be connected via one or more cables to one or more other network devices or clients. The network processing unit 1315 may 1315 may use information included in the network data received at the node 1300, as well as information stored in the tables 1320, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim may be arranged differently including having multiple dependencies, configurations, and combinations.

What is claimed is:

1. A processor-implemented method comprising:
   detecting, at a server node of a network, a light signal from a client node that is not connected to the network;
   determining whether the client node's light signal comprises a trusted set of one or more characteristics from a set of one or more pre-set light signal characteristics, in which at least one of the characteristics is an intrinsic property of the light signal;
   responsive to determining that the client node's light signal comprises the trusted set of one or more characteristics from the set of one or more pre-set light signal characteristics, sending server trust data comprising a unique identifier of the server node to the client node via a light signal comprising one or more characteristics from the set of one or more pre-set light signal characteristics;
   receiving an acknowledgement from the client node via light signal, that the server trust data from the server node matched corresponding server trust data in a client data store at the client node; and
   adding an entry corresponding to the client node to a trust data store and allowing the client node to join the network.

2. The processor-implemented method of claim 1 wherein the set of one or more pre-set light signal characteristics comprises:
   a specific light frequency;
   a specific light frequency range;
   a specific subset range of light frequency with a light frequency range;
   specific intensity modulation; or
   a combination of two or more of the above.

3. The processor-implemented method of claim 1 further comprises:
   encoding the server trust data that comprising the unique identifier of the server node.

4. The processor-implemented method of claim 1 further comprising:
   receiving client trust data comprising a client unique identifier of the client node via a light signal having the set of one or more pre-set light signal characteristics;
   comparing the client trust data against a server trust data store that comprises one or more client unique identifiers corresponding to client nodes that are trusted;
   responsive to the client unique identifier of the client node not being in the server trust data store, not allowing the client node to join the network; and
   responsive to the client unique identifier of the client node being in the server trust data store, proceeding to the step of adding the entry corresponding to the client node to the trust data store and allowing the client node to join the network.

5. The processor-implemented method of claim 4 further comprising:
   securely receiving one or more client unique identifiers corresponding to client nodes that are trusted; and
   updating the server trust data store.

6. The processor-implemented method of claim 1 further comprising:
   responsive to the client node's light signal not comprising the trusted set of one or more characteristics from the set of one or more pre-set light signal characteristics, in which at least one of the characteristics is an intrinsic property of the light signal, indicating to reset one or more features of the client node.

7. The processor-implemented method of claim 1 further comprising:
   following successful connection of the client node to the network, updating a logbook or registry comprising one or more parameters related to the client node.

8. The processor-implemented method of claim 1 wherein the client node is configured at a manufacturer or original equipment manufacturer to comprise:
   a light module that operates with at least the trusted set of one or more characteristics from the set of one or more pre-set light signal settings; and
   a client data store comprising a set of one or more server unique identifiers.

9. The processor-implemented method of claim 1 wherein the server trust data comprises:
   a unique server identifier; and
   a media access control address or a media access control address range.

10. An information handling system comprising:
    one or more processors; and
    a non-transitory information-handling-system-readable medium or media comprising one or more sets of instructions which, when executed by at least one of the one or more processors, causes steps to be performed comprising:
      detecting, at a server node of a network, a light signal from a client node that is not connected to the network;
      determining whether the client node's light signal comprises a trusted set of one or more characteristics from a set of one or more pre-set light signal characteristics, in which at least one of the characteristics is an intrinsic property of the light signal;
      responsive to determining that the client node's light signal comprises the trusted set of one or more characteristics from the set of one or more pre-set light signal characteristics, sending server trust data comprising a unique identifier of the server node to the client node via a light signal comprising one or more characteristics from the set of one or more pre-set light signal characteristics;
      receiving an acknowledgement from the client node via light signal, that the server trust data from the server node matched corresponding server trust data in a client data store at the client node; and
      adding an entry corresponding to the client node to a trust data store and allowing the client node to join the network.

11. The information handling system of claim 10 wherein the set of one or more pre-set light signal characteristics comprises:
- a specific light frequency;
- a specific light frequency range;
- a specific subset range of light frequency with a light frequency range;
- specific intensity modulation; or
- a combination of two or more of the above.

12. The information handling system of claim 10 wherein the non-transitory information-handling-system-readable medium or media further comprises one or more sequences of instructions which, when executed by at least one of the one or more processors, causes steps to be performed comprising:
- encoding the server trust data that comprising the unique identifier of the server node.

13. The information handling system of claim 10 wherein the non-transitory information-handling-system-readable medium or media further comprises one or more sequences of instructions which, when executed by at least one of the one or more processors, causes steps to be performed comprising:
- receiving client trust data comprising a client unique identifier of the client node via a light signal having the set of one or more pre-set light signal characteristics;
- comparing the client trust data against a server trust data store that comprises one or more client unique identifiers corresponding to client nodes that are trusted;
- responsive to the client unique identifier of the client node not being in the server trust data store, not allowing the client node to join the network; and
- responsive to the client unique identifier of the client node being in the server trust data store, proceeding to the step of adding the entry corresponding to the client node to the trust data store and allowing the client node to join the network.

14. The information handling system of claim 13 wherein the non-transitory information-handling-system-readable medium or media further comprises one or more sequences of instructions which, when executed by at least one of the one or more processors, causes steps to be performed comprising:
- securely receiving one or more client unique identifiers corresponding to client nodes that are trusted; and
- updating the server trust data store.

15. The information handling system of claim 10 wherein the non-transitory information-handling-system-readable medium or media further comprises one or more sequences of instructions which, when executed by at least one of the one or more processors, causes steps to be performed comprising:
- responsive to the client node's light signal not comprising the trusted set of one or more characteristics from the set of one or more pre-set light signal characteristics, in which at least one of the characteristics is an intrinsic property of the light signal, indicating to reset one or more features of the client node.

16. The information handling system of claim 10 wherein the client node is configured at a manufacturer or original equipment manufacturer to comprise:
- a light module that operates with at least the trusted set of one or more characteristics from the set of one or more pre-set light signal settings; and
- a client data store comprising a set of one or more server unique identifiers.

17. The information handling system of claim 10 wherein the server trust data comprises:
- a unique server identifier; and
- a media access control address or a media access control address range.

18. A method comprising:
- detecting, at a first information handling system, a light signal from a second information handling system;
- determining whether the light signal from the second information handling system comprises a trusted set of one or more characteristics from a set of one or more pre-set light signal characteristics, in which at least one of the characteristics is an intrinsic property of the light signal;
- determining whether data transmitted via the light signal from the second information handling system comprises verification data; and
- responsive to determining that the second information handling system's light signal comprises the trusted set of one or more characteristics from the set of one or more pre-set light signal characteristics and that data transmitted via the light signal from the second information handling system comprises the verification data:
  - forming a network that comprises the second information handling system;
  - joining a network that comprises the second information handling system; or
  - allowing the second information handling system to join a network that comprises the first information handling system.

19. The method of claim 18 further comprising:
- responsive to determining that either (1) the second information handling system's light signal does not comprise the trusted set of one or more characteristics from the set of one or more pre-set light signal characteristics or (2) that data transmitted via the light signal from the second information handling system does not comprises the verification data:
  - not forming a network that comprises the second information handling system;
  - not joining a network that comprises the second information handling system;
  - not allowing the second information handling system to join a network that comprises the first information handling system;
  - blocking data received from the second information handling system; or
  - not transmitting data to the second information system.

20. The method of claim 18 wherein the set of one or more pre-set light signal characteristics comprises:
- a specific light frequency;
- a specific light frequency range;
- a specific subset range of light frequency with a light frequency range;
- specific intensity modulation; or
- a combination of two or more of the above.

* * * * *